United States Patent

[11] 3,614,454

[72] Inventors Maurice Koulicovitch
Geneva;
Jacques Pettavel, Geneva; Pierre Wehrli,
Chene-Bougeries-Geneva, all of
Switzerland
[21] Appl. No. 823,381
[22] Filed May 9, 1969
[45] Patented Oct. 19, 1971
[73] Assignee Societe Genevoise D'Instruments de Physique
Geneva, Switzerland
[32] Priority June 17, 1968
[33] Switzerland
[31] 9042/68

[54] MACHINE FOR MEASURING GEOMETRICAL PARAMETERS OF A TRANSPARENCY, SUCH AS MASKS FOR INTEGRATED CIRCUITS
9 Claims, 2 Drawing Figs.

[52] U.S. Cl. .................................................. 250/219 Q,
356/110, 250/216
[51] Int. Cl. ....................................................... G01n 21/30
[50] Field of Search........................................... 250/219 I,
235, 217, 222, 216, 237; 356/106, 109, 110, 201,
209, 71; 350/81

[56] References Cited
UNITED STATES PATENTS

| | | | |
|---|---|---|---|
| 3,446,562 | 5/1969 | Caspersson et al. | 250/217 X |
| 3,503,684 | 3/1970 | Preston, Jr. et al. | 356/71 X |
| 3,524,706 | 8/1970 | Farr | 356/71 |
| 2,368,434 | 1/1945 | Turrettini | 350/81 |
| 3,013,467 | 12/1961 | Minsky | 356/201 |
| 3,297,873 | 1/1967 | Houanian et al. | 356/201 |
| 3,409,375 | 11/1968 | Hubbard | 356/201 |
| 3,421,806 | 1/1969 | Weber | 356/201 |

*Primary Examiner*—Walter Stolwein
*Attorney*—Young & Thompson

ABSTRACT: The invention concerns a machine for measuring geometrical parameters of a transparency, namely masks for integrated circuits. The machine includes a photoelectrical microscope, the light source of which is a laser. The laser is also used as a light source for an interferometer and an observation means of the apparatus.

INVENTORS
MAURICE KOULICOVITCH
JACQUES PETTAVEL
PIERRE WEHRLI
By Young & Thompson

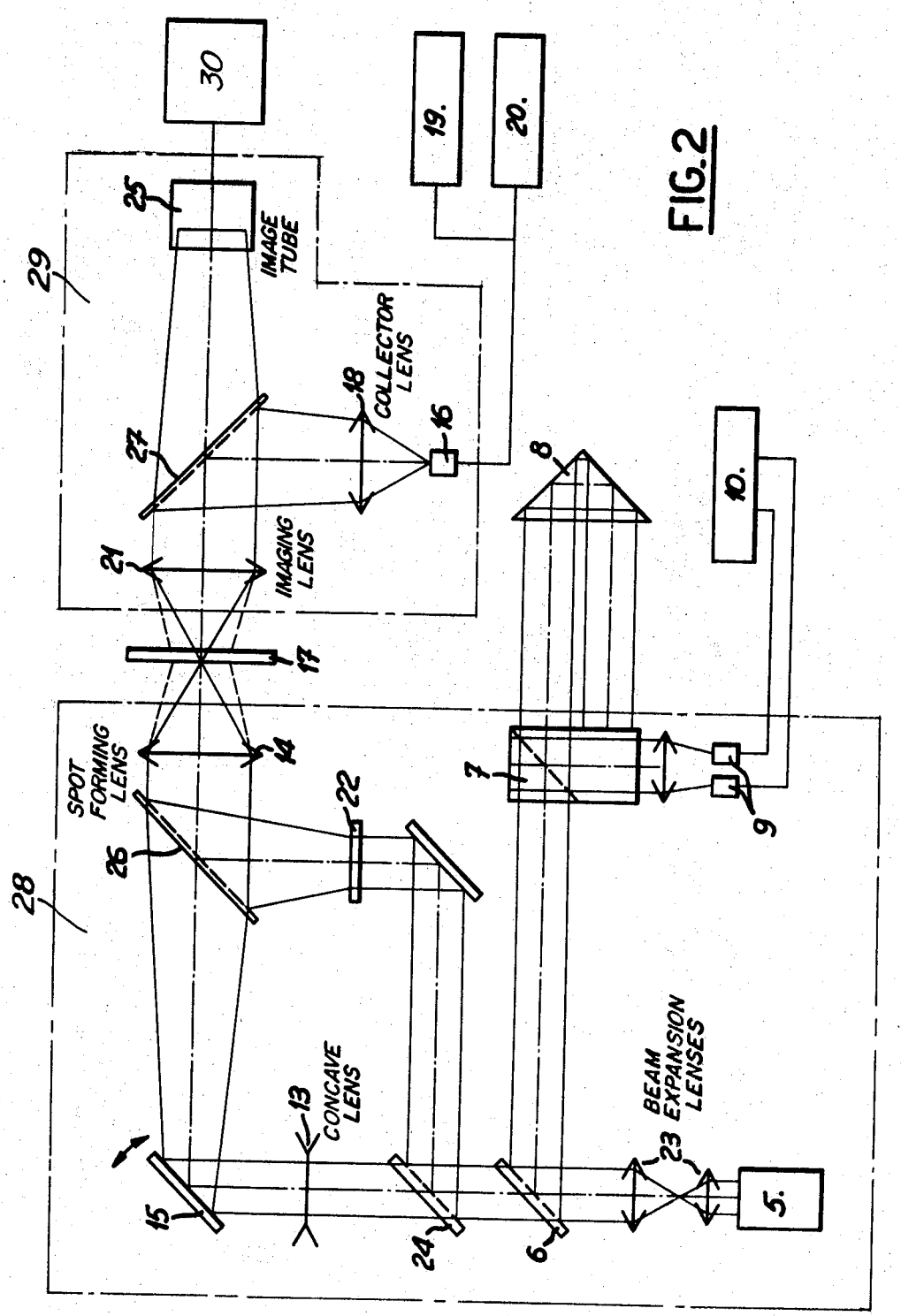

MACHINE FOR MEASURING GEOMETRICAL PARAMETERS OF A TRANSPARENCY, SUCH AS MASKS FOR INTEGRATED CIRCUITS

The mask to be measured is a transparency bearing a number of small unitary drawings located at a given distance from each other and thus covering part of the transparency.

The unitary drawings are generally formed by a number of straight lines and rectangular surfaces, the details of which may have a dimension in the area of 1/1000th millimeter (1 $\mu$m.). It is, of course, not excluded that the drawing includes curves.

To set the ideas, let's consider that a mask may include a square 40 by 40 mm. in size bearing for example a series of complex drawings, the dimension of which may be 1 by 1 mm., located at a distance of 1 mm. from each other. One would thereby have 20 lines of 20 unitary drawings which is 400 drawings supposed identical.

It is necessary to check among other things, and for example: the exact distance between a unitary drawing and another one and particularly between the first and the last one on the basis of marks provided to this effect.

Inside a unitary drawing it may prove necessary to check some spacings and particularly the distance between the two edges of parallel surfaces.

The masks being made by microphotography, it is possible depending on the exposition to light of the sensitive layer, that some surfaces may become thinner or wider after development.

The manufacture of integrated circuits necessitates a series of operations controlled each by a particular mask and it is, therefore, necessary that the cooperation of these successive masks be perfect and it is, therefore, imperative that the scales of the successive masks be identical.

The working of an integrated circuit being largely dependent on the dimension of its element it is obvious that masks which are not very precise increase the number of rejects among the unitary integrated circuits. On the contrary when using masks which are precise and properly checked, more complex unitary circuits may be produced without a prohibitive amount of rejects.

The present invention has for its object a machine for measuring geometrical parameters of a transparency, namely on masks for integrated circuits, distinctive in that it includes a photoelectrical microscope the light source of which is a laser.

The attached drawing identifies schematically and by way of example an embodiment of the measuring machine of the invention.

FIG. 2 is an optical diagram of the machine.

Figure 1:
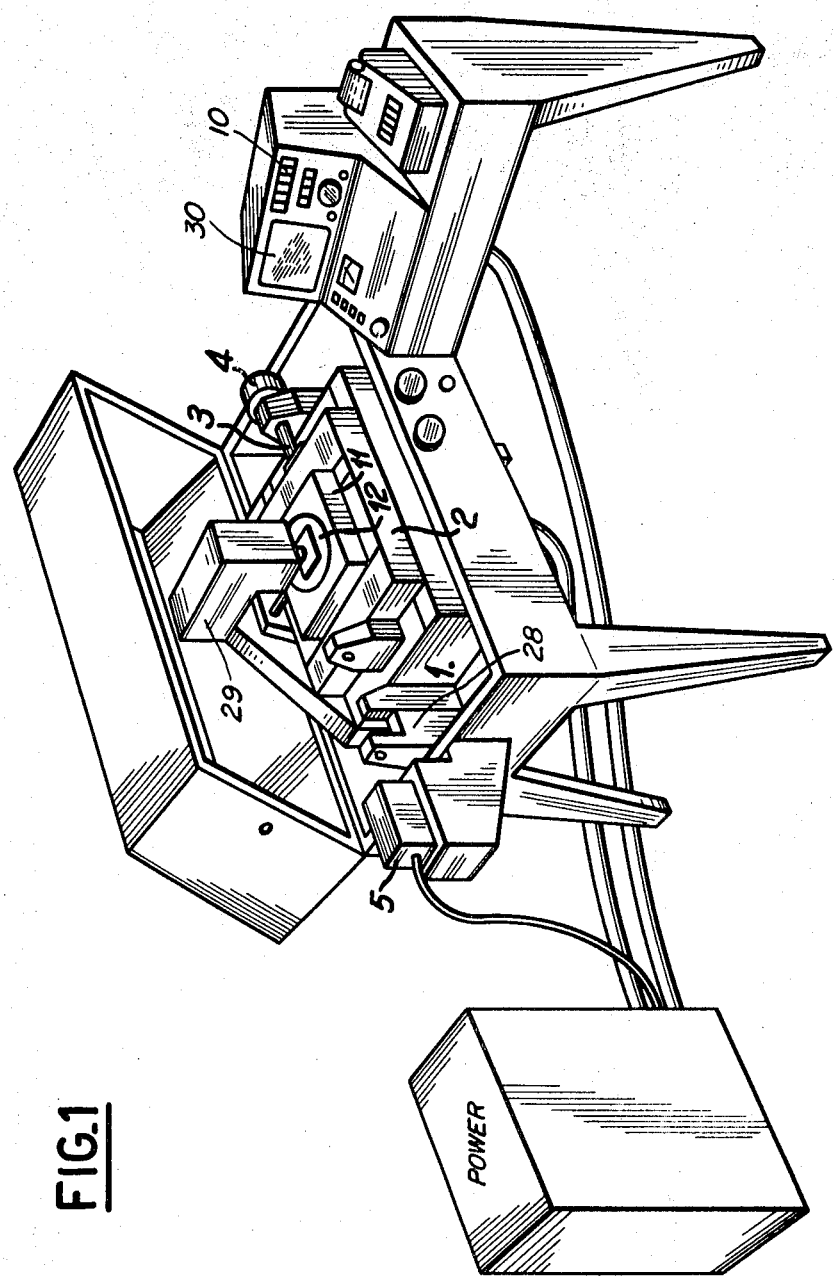
FIG. 1 is an overall view in perspective of this measuring machine.

The geometrical conditions set for a masks measuring machine may be the following:

Total amplitude of motion approximately 100 mm.
Precision of spotting a position at least 0.1 $\mu$m.

To obtain such results it is necessary to use a series of means which will be listed herebelow and which characterize the machine as described.

The machine includes a bench 1 with flat slides and V-shaped slides supporting a table 2 movable on a bed of hollow rollers (slightly elastic to distribute the load).

The table 2 is moved by means of a screw 3 and a ball nut (to avoid slackness). The screw 3 is rotated by means of a variable speed motor 4 controlled by hand and which may also be subjected to the position signals (see below).

The position of this table is measured by means of an interferometer lighted by a stabilized laser 5. The interferometer is constituted by the following conventional elements:

A fixed mirror 6, a beam separating system 7, a movable mirror 8 fixed to the table 2 at the level of a mask 17, in the shape of an optical square (trirectangular trihedron) so that the light beam is returned in parallel to itself and that the measurement of the length is made in the axis of the item to be measured.

The interference bands are transformed into electrical impulses by photoelectric cells 9 and counted by means of a fast electronic counter 10 which adds in one direction of the displacement and subtracts in the other direction.

The disposition of the interferometer and of the counter is such that the display accumulates eight impulses per wavelength $\lambda$, that is for $\lambda=0.628$ $\mu$m. (Laser neon-helium). This gives a pitch of 0.0785 $\mu$m. which is thinner than the 1/10 $\mu$m. required.

The transposition of fractions of $\lambda$ into $\mu$m. may be performed on the machine itself by incorporating a multiplying element between the counter and the display or else it may be done after reading by means foreign to the machine.

The distances which are measured with the interferometer are perturbed by the variations of the index of the air which may show differences up to $10^{14}$ in a normal environment while the requirement of 0.1 $\mu$m. for a travelling length of 100 mm. corresponds to a precision of $10^{16}$. To avoid such influence of the environment the interferometer is placed in a closed surroundings at reduced pressure. A "vacuum" of 1 mm. Hg is sufficient.

To simplify the construction and taking into account the small dimension of the measuring machine, this may work while being entirely enclosed in surroundings permanently evacuated (at 1 mm. Hg) by means of a vane-type pump drawing the air.

To accelerate the manipulations, as soon as the surroundings of the machine are reclosed over the mask to be measured, it communicates through a valve with a vacuum reserve, that is a tight subsidiary container which has been evacuated while the manipulations were taking place by means of the same vane-type pump. Therefore, within less than a minute conditions for a nonperturbed functioning of the interferometer are achieved. The opening is made after air has been let in through another valve and a dust filter.

The table which is thus displaced by the screw and the motor and the position of which is known through the interferometer supports another table 11 which moves perpendicularly, supporting itself a rotating table 12 on which the mask 17 is fixed. Thereby it is possible to measure the positions of the drawings on the mask, line by line, and then to measure the positions of the drawings in the perpendicular direction after having rotated the mask at right angle (or possibly at any angle).

The elements of the drawings of the mask must be spotted with sufficient precision.

The system used is a photoelectrical sweeping microscope somewhat similar to known photoelectric microscope.

The exploring spot is the image formed by the concentration at the focus of a wide opening lens of the light beam of a laser 5 which has been made slightly divergent by means of a concave lens 13. The light spot which is thus formed is smaller and brighter than one which may be obtained by any other method.

Before being concentrated by lens 14, the beam of the laser is made to oscillate sidewise by deflecting means 15 including an electrodynamic motor fed with alternating current which makes a mirror reflecting the beam to oscillate. Thereby the spot which explores the element of the drawing to be spotted is displaced parallel to the measurement axis from left to right and from right to left.

A photoelectrical cell 16, a germanium cell for example, located on the other side of the mask 17 behind a collector lens 18, collects the light which passes through the mask and is more or less obliterated by the opaque elements of the mask. As a result electrical signals produced by the cell may be amplified and shaped by appropriate and well-known electronic signal shaping circuits 19 and 20.

The signals are conditioned by the shape of the transparent openings:

If they are wide, the signal has the shape of a rectangle and it is possible to spot the position of the edges by deriving, with respect to time, the rectangular electrical signal. This gives two triangular impulses (one for each edge).

If they are narrow, the signal has the shape of a sharp triangle and it can be exactly compared to the one which is obtained on a conventional photoelectrical microscope.

It is thus possible to determine with precision (about 1/100 $\mu$m.) the position of the edges of a wide opening and the position of the center of a thin or wide opening. The motor driving the table is subjected to the signal so that it may be centered exactly on the mark chosen.

The width of the opening may be determined for a wide opening by the distance of its two edges. But also, in case of a narrow opening, by measuring comparatively the amount of light passing, that is by integrating the current produced by the cell. It is easy to elaborate the indication which is delivered by modifying the intensity of the light source.

A very thin opaque line between two transparent areas gives a sharp triangular signal but turned over with respect to a signal delivered by a thin slit.

The turned over signal is electrically inversed and treated as described before. It is therefore equivalent to it.

During the measurement it is desirable that the operator may see the unitary design of the measured mask. Therefore, the total surface of the transparency is lighted with diffusive light obtained from the laser 5 through the same lens 14 and taken up by lens 21 forming an enlarged image of the unitary design (approximately 1.2 by 1.2 mm.) on the front of an image tube of a closed circuit television system (9 by 9 mm.) the projection of which becomes enlarged on a conventional receptor's tube (for example 200 by 200 mm.).

The same laser always lights the three above-mentioned elements that is: the interferometer, the photoelectric microscope for spotting and the television for observation.

The optical arrangement for obtaining this repartition of the light is the following:

The beam delivered by the laser passes through a telescope expanding the diameter of the beam 23, since the original diameter of 3 mm. is unhandy for use namely in an interferometer. The telescope restores a parallel beam of a diameter of 6 mm.

The light fractions used are taken up by flat parallel glass plates 6, 24, at an angle of 45° with respect to the beam and provided on one side with a coating which is in part reflecting and in part transparent. The other side is treated so as to be nonreflecting in order to avoid double images and losses of light.

The three beams thus separated by this fractioning system follow different optical ways which are described hereafter:

1. First fraction, for the interferometer which is directly fed by the expanded beam.

2. Second fraction, for the photoelectric microscope: the beam passes through a divergent lens 13 so that the lens forming the spot be lighted on its full diameter which is in the area of 15 mm. and before reaching the lens 14 it passes through an oscillating mirror 15 which confers to it the exploratory displacement.

3. Third fraction, for the observatory television: the beam lights by transparence a diffusing glass 22 placed so that its real image given by lens 14 forming the spot be projected into lens 21 which gives a real image of the drawing observed on the mask, on the front 30 of the image tube 25 of the television.

The lighting beams of the second and third fractions passing through the same lens and the same object, but being directed, the first towards the germanium photoelectric cell and the second towards the "image tube" are united before reaching the lens by a flat glass with parallel sides 26 positioned at an angle and with one of its sides partly reflecting and partly transparent and the other side treated "antireflex."

After having passed the first lens and the object (the mask), the lighting beams are distributed by a flat glass with parallel sides 27 similar to the first one, towards the cell 16 and the image tube 25. As a result the cell receives from the beam which is oriented towards it and concentrated on it by the preceding lens, a large quantity of light modulated by the movement of the spot with respect to the elements of the drawing. But in addition it receives a small quantity of diffused and nonmodulated light which does not produce any signal. Consequently everything works as if the cell could be lighted only by the beam which it is supposed to receive.

The other fraction of these two combined beams arrives through a second lens 21 in the form of true images on the face of the image tube 25 of the television. These two images are, of course, the image of the unitary design, but in addition the moving spot is superposed thereon and appears like a little brilliant bar which can be seen through the transparent parts of the drawing. This permits to spot on the total image the place of which the position is measured.

As one of the many possible physical arrangements of the elements of the invention, the block 28 shown in FIG. 2 may be disposed as seen in FIG. 1, rigidly mounted on the frame of the machine at the left part of that frame and also in the portion of the frame which is located under the table 2. The elements in the block 29 in FIG. 2 may be rigidly connected to the frame 1 of the machine and located in the part of the frame disposed above the table 11. Of course, any number of other physical arrangements will suggest themselves to persons having ordinary skill in this art.

As an alternative, the interferometer could be replaced by any other metrological means permitting to determine accurately the position of the table.

In addition the metrological measuring and observatory means may be lighted from different light sources, at least with respect to the metrological means.

Finally the observatory means through television may be of the "flying spot" type and one could use for this directly the spot used for measuring. In this case the observation and the measuring could not be done simultaneously since the sweeping conditions of the spot would be different for measuring and for the observation.

We claim:

1. A very high precision measuring machine for determining the geometrical parameters of masks for integrated circuits which constitute a transparency bearing a number of small unitary drawings comprising mounting means for mounting masks for integrated circuits and for moving said masks, optical displacement measuring means for providing a precise measurement of the displacement of said mounting means, said optical displacement measuring means employing a light beam from a light source, electrooptical detection means operative to provide an electrical output signal indicative of geometrical parameters of a specific unitary drawing, said electrooptical detection means including light spot forming means to receive a light beam from a light source and to concentrate said light beam to direct a small, bright light spot upon a mask mounted on said mounting means, a single laser light source for providing a laser beam, and light fractioning means for receiving and dividing said laser beam to provide a first beam to said optical displacement measuring means and a second beam to said electrooptical detection means.

2. The measuring machine of claim 1 which includes visual sighting means operative to provide an image of a unitary design on a mask being measured, said visual sighting means including optical means to receive a light beam and to light the surface of a mask mounted on said mounting means with diffusive light, said fractioning means operating to provide a third beam to said visual sighting means.

3. The measuring machine of claim 1 wherein said light spot forming means includes an oscillating reflector to cause said light spot to scan said mask.

4. The measuring machine of claim 2 wherein said visual sighting means operates to provide an image of a unitary design and the position of said light spot on said unitary design when the light spot is directed onto said mask.

5. The measuring machine of claim 4 wherein an image receiving means is provided to receive both an image projected by said light spot and the image of said unitary design projected by said diffusive light from said mask, said image receiving means operating to direct the image projected by said light spot to a first receiving means and the image of said unitary design with an image of the position of said light spot to a second receiving means.

6. The measuring machine of claim 14 wherein said spot forming means includes an oscillating reflector means to receive said second beam from said fractioning means, said oscillating reflector means operating to reflect said second beam and to cause said light spot to scan said mask, and a concentrating lens means operative to receive said reflected second light beam and to focus said second light beam on said mask to provide said light spot, said visual sighting means including light diffusing means to diffuse a light beam and reflector means to receive said third light beam from said fractioning means and operating to direct said third light beam on said light diffusing means, and optical light directing means positioned between oscillating reflector means and said concentrating lens means, said light directing means operating to pass the second light beam reflected by said oscillating reflector means to said concentrating lens means and to direct the diffused light from said light diffusing means through said concentrating lens means to said mask.

7. The measuring machine of claim 2 wherein said optical displacement measuring means includes an interferometer having optical mirror means mounted upon said movable mounting means at the level of said mask, said optical mirror means operating to direct an incident beam of light back on a path parallel to and displaced from the path of the incident beam.

8. The measuring machine of claim 5 wherein said electrooptical detection means includes said first receiving means which includes photosensitive means to receive the image projected by said light spot from said image receiving means, said photosensitive means operating to provide an electrical output signal indicative of the image projected by said light spot.

9. The measuring machine of claim 5 wherein said visual sighting means includes said second receiving means, said second receiving means including image tube means operative to receive the image of said unitary design from said image receiving means and to provide a real image of said unitary design on a television viewer.